Patented June 13, 1939

2,162,217

UNITED STATES PATENT OFFICE 2,162,217

METHOD FOR THE PRODUCTION OF YEAST

Johann Hilbers, Oldenburg-Etzhorn, Germany

No Drawing. Application January 14, 1937, Serial No. 120,512. In Germany January 7, 1936

5 Claims. (Cl. 195—95)

The present invention relates to a method for the production of yeast according to the additory process. Hitherto this method in which the wort is gradually introduced into the liquid containing the pitching yeast has been carried out solely in weak acid solutions in order to prevent any infection of the yeast. The addition of acid which prevents the growth of undesired cultures does, however, not hinder the development of yeast which has a relatively high resistance against acid. For these reasons in the methods known hitherto, the fermentable liquid is, after completion of the main fermentation, kept weakly acid for which purpose sulphuric acid is eventually added. Yeasts produced according to this method generally were satisfactory, but often had a small stability and after a short time of storage show a decrease in the capacity for forming a head and a tendency to become gritty.

Now it has been found, that a substantially better maturated yeast of correspondingly greater stability may be obtained if, before completion of the main fermentation which at first, is carried out in well known manner under weakly acid conditions, the wort is brought to the neutral point with regard to litmus paper after addition of all the alkali, and the fermented wort being neutral is, after finishing the addition of the molasses, further aerated until perfect maturation of the yeast is obtained. Any change of the wort over to the alkaline side is positively prevented by the fact, that the wort at the end of the main fermentation process is brought to the neutral point by continuing the initial powerful aeration.

It has already been proposed to inhibit the increase of acidity produced by the mineral acids liberated by the yeast in order to remove the harmful influence of these mineral acids on the growth of the yeast. The presence of organic acids which do not unfavorably influence the growth of the yeast has, however, been considered hitherto as indispensable for the reasons given above.

The assimilating capacity of the yeast cells is increased according to the new method by means of the continued powerful aeration after the addition of the wort has been finished. The yeast cells, therefore, at first consume the total amount of sugar present and finally also the small amounts of organic acids present. Only after the liquid is free of sugar and acid, does the yeast arrive at a maturated final condition in which it has an excellent stability. The yeast maturates and so deposits the substances taken up in the cell in a manner required in the condition of rest. Substances no longer used by the cells are disposed off and therefore removed during the subsequent washing, separating and pressing of the yeast. The wall of the yeast cells obtained is then clean and does not show a cover layer which forms a nutritive soil for bacteria which spoil the yeast and influence the color of the same.

Such a perfect maturation of the yeast cells is impossible in the methods known hitherto using an acid solution, since the yeast cells take up the organic acids as nourishment just as they do the sugar and therefore they do not perfectly come to rest. A yeast not perfectly maturated continues to work after pressing. The substances present in the cell are re-arranged and partly separated, whereby the capacity of the yeast for forming a head is decreased. With a sticky condition being present in the substance disposed of, moreover, the feared gritty condition results. Even if this phenomenon does not occur, the exudation of nutritious substances is harmful to the yeast, because such substances form the nutritive soil for the bacteria which spoil the yeast.

As according to the new method, the yeast is obtained in a maturated final condition and no exudation of nutritious substances or the like occurs after pressing, it is also possible to operate without disadvantage with considerably higher concentrations of the wort. From an economical point of view this is of greatest importance, because not only space, work, water, air and steam are saved, but, moreover, a yeast of greater dryness is obtained. With the same weight of the wet yeast and equal albumen contents, the purchaser receives a greater amount of albumen in the dry substance.

To explain the subject matter of the invention, the known and the new method are compared below in one example each. In both examples 3500 kg. of molasses are treated according to the additory process under addition of corresponding amounts of phosphorus and nitrogen. In both methods any raw materials may be used. Therefore, molasses cleared chemically as well as by a separator may be employed. Moreover, nitrogen may be added as ammonium biphosphate, ammonium persulphate and ammonia, whereby in carrying out the new method attention is to be directed to the fact only, that too high an increase of the acid concentration is not allowed. An exclusive introduction of nitrogen by ammonium persulphate is, therefore, to be obviated in carrying out the new method and a considerable portion of the nitrogen is to be introduced as ammonia.

EXAMPLE 1

Known method

In carrying out the usual method, first of all 700 kg. of yeast are brought to an acid content of 2° and the yeast is left to itself for an hour. The stated degree of acidity is then reached if 2 cm.³ of N caustic soda solution, are required to neutralize the same with regard to litmus and 20 cm.³ of the yeast floating in the water. Then 25 cm.³ of a diluted wort, containing 400 kg. of molasses, are filled into a container or vat of a capacity of 120 m.³ and mixed with the pitching yeast prepared in the manner stated above. The wort is now so far acidified, that 0.5 cm.³ of N/10 caustic soda solution are required for 20 cm.³ of wort to reach the neutral point with regard to litmus. The wort at first has a concentration of 1.55° Balling. Now the wort is aerated by 3000 m.³ of air per hour, thereby starting the fermentation. After a pre-fermentation of a period of one hour, the addition of the remaining 3100 kg. of molasses is started. During the supply of molasses extending over a period of 9.5 hours the fermentation is carried out in such a manner, that the degree of acidity substantially remains constant. The amounts of nitrogen and ammonia required are added in the first 8 hours by 61.5 kg. ammonium biphosphate and 103 liters of a 25% ammonia. To stop a decrease of the degree of acidity after addition of the salts, the supply of air is reduced, 2 hours before finishing the addition of molasses, reduced to 2400 m.³ and then to 1500 m.³ per hour.

After finishing the addition of molasses, the vat contains 98 m.³ of a wort of 1.7° Balling. The degree of acidity content of the wort is after completion of the addition so great, that about 0.4 cm.³ of an N/10 caustic soda solution are required to neutralize 20 cm.³ of wort with regard to litmus. After expiration of one hour, the amount of caustic soda solution required for the neutralization of 20 cm.³ of wort has dropped to 0.25 cm.³ To maintain the degree of acidity 2 liters of a 60% concentrated sulphuric acid are added and the air supply is gradually cut off, so that the wort is slowly agitated only.

After a total period of 13 hours of fermentation the wort, at the beginning of the separation, has a concentration of 1.7° Balling. 20 cm.³ of wort require 0.3 cm.³ of an N/10 caustic soda solution for neutralization with regard to litmus.

The yeast output amounts to 2310 kg. of yeast which after deduction of 700 kg. of pitching yeast corresponds to an output of 46% with regard to the molasses used. The percentage of nitrogen of the pressed yeast amounts to 1.83%. With a dry content of 26.51% an albumen content of 24.52% results.

EXAMPLE 2

New method

In carrying out the new method 600 kg. of yeast are at first brought to an acid content of 2° and then the yeast is left to itself for 1 hour. Then 30 m.³ of water are filled into a container or vat of a capacity of 60 m.³ and mixed with the pitching yeast prepared in the manner stated above. The wort has a concentration of 1.0° Balling and 20 cm.³ of the wort require 0.35 cm.³ of an N/10 caustic soda solution for neutralization with regard to litmus. The wort at first free of molasses is now aerated by supplying 3000 m.³ of air per hour and is then mixed gradually during a period of 11 hours with 3500 kg. of molasses. During the fermentation thereby taking place, the concentration stated in Balling is gradually increased, because from the beginning the container or vat is filled with the total amount of water required. The degree of acidity is kept as low as possible. A certain acidity is required to absolutely prevent turning of the wort over to the alkaline side during the addition of nitrogen and phosphorus in the first 9 hours. The nitrogen and phosphorus are supplied in the form of 150 kg. of superphosphate, 45 kg. of ammonium persulphate and 85 liters of ammonia of 25%. After addition of the total amounts of nitrogen and phosphorus, i. e. after the fermentation of 9 hours, 0.4 cm.³ of an N/10 caustic soda solution are required to neutralize 20 cm.³ of wort with regard to litmus. By uniform maintenance of a strong aeration the acidity drops, so that after 10 hours only 0.25 cm.³ of an N/10 caustic soda solution are required for the neutralization of the same amount of wort and after the addition of the molasses is finished, i. e. after 11 hours, the wort is neutral with regard to litmus. The aeration with 3000 m.³ of air per hour is, after reaching the neutral point, continued for a short period of time to prevent any re-formation of acid. The aeration is then gradually reduced and interrupted after further 2½ hours. The yeast is now perfectly matured in the wort free of sugar and acid.

An amount of wort of 42 m.³ is obtained with a concentration of 3.4° Balling. The yeast output amounts to 2481 kg. which after deduction of 600 kg. of the pitching yeast corresponds to an output of 53.74% with regard to the molasses. The alcohol output which also results amounts to 320 liters=12% also related to molasses.

The nitrogen content of the pressed yeast amounts to 2.33% which with a dry content of 32.06% corresponds to an albumen content of 45.42%.

Of course, the invention is not to be limited to the statements given in the above examples, since alterations in many respects may be made in accordance with the operating conditions.

Having now fully described my invention, I claim:

1. A process for manufacturing yeast by propagation with aeration, which consists in suspending seed yeast in an aqueous liquid of weak acidity, subjecting the weakly acid aqueous liquid to aeration and adding continuously molasses and other yeast nutrients, stopping the addition of the yeast nutrients when a sufficient amount thereof has been added to produce the predetermined amount of yeast, neutralizing the resulting wort by aeration and continuing the aeration until perfect maturation of the yeast is obtained.

2. A process for manufacturing yeast by propagation with aeration, which consists in suspending seed yeast in an aqueous liquid of weak acidity, subjecting the weakly acid aqueous liquid to powerful aeration and adding continuously molasses and other yeast nutrients, stopping the addition of the yeast nutrients when a sufficient amount thereof has been added to produce the predetermined amount of yeast, neutralizing the wort by continuing the initial powerful aeration, and further aerating the resulting neutralized wort until perfect maturation of the yeast is obtained.

3. A process for manufacturing yeast by propagation with aeration, which consists in suspending seed yeast in an aqueous liquid of weak acidity, subjecting the weakly acid liquid to areation and adding continuously molasses and other yeast nutrients in sufficient quantities to produce a wort of high concentration, stopping the addition of the yeast nutrients when a sufficient amount thereof has been added to produce the predetermined amount of yeast, neutralizing the concentrated wort by aeration thereof, and continuing the aeration of the resulting neutralized wort until perfect maturation of the yeast is obtained.

4. A process for manufacturing yeast by propagation with aeration, which consists in suspending seed yeast in an aqueous liquid of weak acidity, subjecting the weakly acid aqueous liquid to powerful aeration and adding continuously molasses and other yeast nutrients in sufficient quantities to produce a wort of high concentration, stopping the addition of the yeast nutrients when a sufficient amount thereof has been added to produce the predetermined amount of yeast, neutralizing the concentrated wort by continuing the initial powerful aeration, and further aerating the resulting neutralized wort until perfect maturation of the yeast is obtained.

5. A process for manufacturing yeast by propagation with aeration, which consists in suspending seed yeast in an aqueous liquid of weak acidity, subjecting the weakly acid aqueous liquid to powerful aeration and adding continuously molasses and other yeast nutrients including nitrogen and phosphorus in sufficient quantities to produce a wort of high concentration, stopping the addition of the molasses and also of the other yeast nutrients including the nitrogen and phosphorus when a sufficient amount thereof has been added to produce the predetermined amount of yeast, neutralizing the concentrated wort exclusively by continuing the initial powerful aeration, and further aerating the resulting neutralized wort until perfect maturation of the yeast is obtained.

JOHANN HILBERS.